6659X
M. L. Stanton, [redacted]
Horse Power.
Patented July 21, 1831.
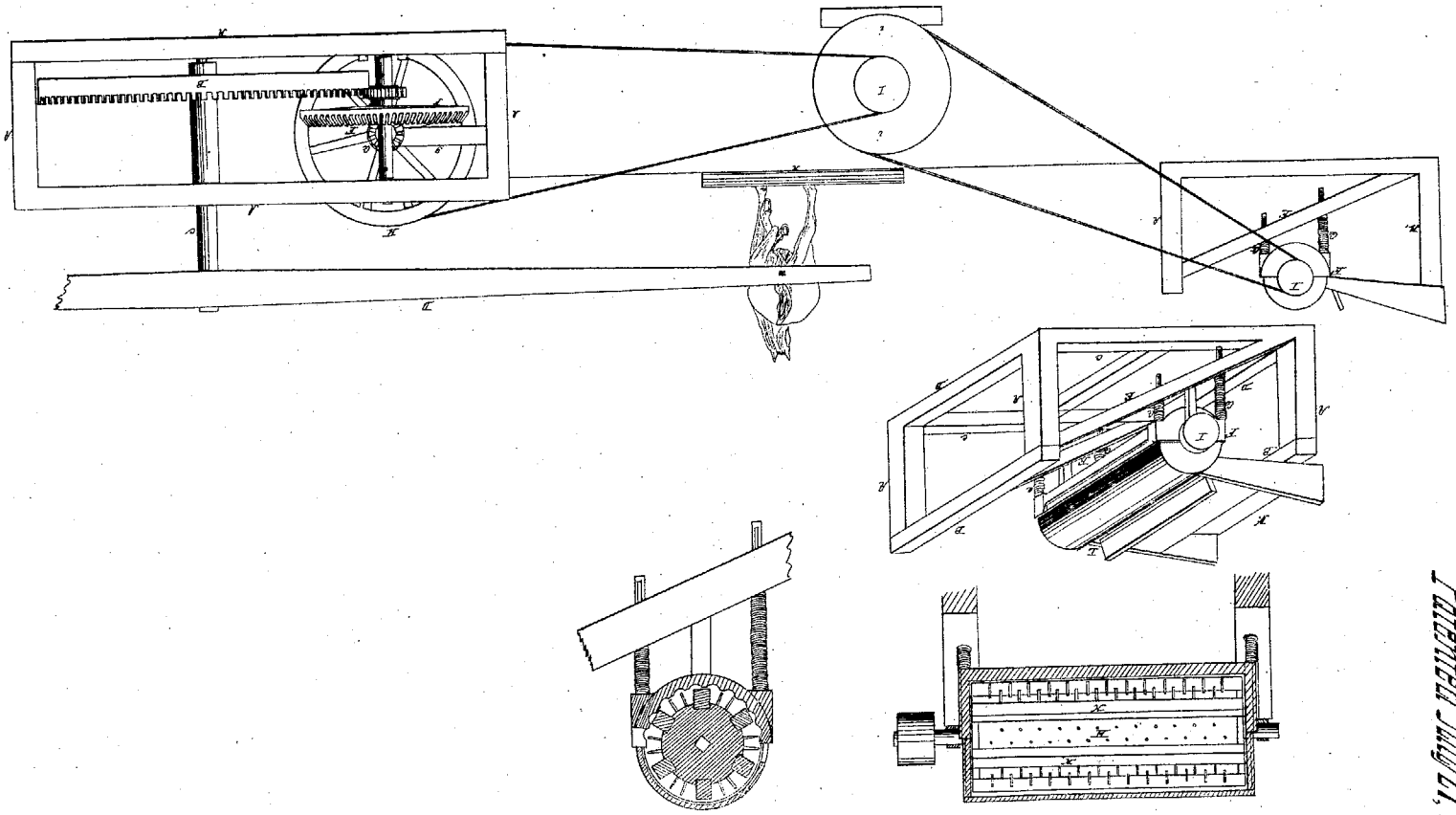
AM. PHOTO-LITHO. CO. N.Y. (OSBORNE'S PROCESS)

6659X [illegible] July 21, 1831 207.

Nehemiah P. Stanton
Letters Patent

The Schedule referred to in these Letters Patent and making part of the same containing a description in the words of the said Nehemiah P. Stanton himself of his improvement in the Threshing Machine together with the application of Horse Power for operating said machine

---

To all to whom these presents shall come. Be it known that I Nehemiah P. Stanton of the village of Syracuse in the County of Onondaga & State of New York have invented a new and useful improvement on a machine for Threshing grain & the Horse Power to operate said machine & which Horse power may be applied to all other uses and purposes to which Horse power is or may be applied and that the following is a full and exact description of the construction & operation of the said machine & Horse Power as invented or improved by me. Said machine is constructed with a frame five feet long three feet two inches wide & two feet four inches high made with four posts, two plates, two sills, three girts [illegible] timbers, with a brace from the foot of each forward post to the top of each back post calculated to receive the [illegible] concave bed which is to be made of hard wood plank fluted & faced with wrought iron three fourths of an inch wide & three sixteenths of an inch thick to be fastened on with screws or said bed may be lined with a cast iron concave plate fluted as aforesaid. The bed stands on four spiral springs placed between the said braces & the bed for the purpose of suffering hard substances to escape between the bed & cylinder without injuring either. The length of the bed may be about two feet six inches & the width may be twelve inches faced with iron where the grain enters the machine. The bed is to be gauged by keys passing thro' arms which extend from the bed through the spring & braces. The cylinder is to be the same length of the bed made round of solid hard wood nine inches diameter with an iron shaft running through it an inch and a half square with a bearing at each end of the cylinder one end of the shaft runs far enough out to receive a wheel of about six inches diameter. There are six wooden [illegible] an inch & three quarters thick & two inches wide running lengthways of the cylinder

[illegible]

6659X cylinder & ground in so as to project one inch & a half & fastened with spikes
& faced on the side towards the hopper with wrought iron plates two inches
wide & three sixteenths of an inch thick secured by screws or rivets. There are
twenty five spikes between each beater made of wrought iron half an inch
square with a screw cut on one end & drawn to a square point at the other which
are to be screwed into the cylinder so as to project two inches. They are to be
set in two rows in space forming a cylinder with six beaters & one hundred
and fifty spikes. The ends of the cylinder are secured by iron bands. The cyl-
inder plays into the concave or circular bed before described & is covered with
a circular case of sheet iron. There is a feeding table with a throat to receive
the grain & directly over it a throat to discharge the dust. The improve-
ment which I claim in the above Thrashing machine is the constructing &
uniting of spikes & beaters in the same cylinder with the cast iron concave bed,
the sheet iron case & the construction of the dirt discharger. The description &
specification of the Horse power above mentioned is as follows. The frame is to
be nine feet long & eight feet wide & three feet high with three sills, three
plates, six posts and two girts which frame contains the following gear-
ing. One crown wheel six feet diameter with spur gearing of cast iron with
wooden shaft, arms and rim. The shaft is two feet eight inches long & stands
perpendicular with a step gudgeon at the lower end which steps into a box in
the middle sill with a swing gudgeon at the top with a neck passing thro
the middle plate, on the top of the neck is a diamond head upon which
the lever is let on to by means of a mortise in the centre. The whole length of
the lever is twenty four feet: it is made eight inches square in the mid-
dle & tapers to three inches square at each end. Said crown wheel meshes
into a ten inch pinion on another upright shaft stepped into the same
sill at the bottom & running in a box in the same plate at the top with the
crown wheel shaft. The shaft of the pinion wheel is regulated by keys at the
top & bottom so as to mesh in & out with the crown wheel as may be neces-
sary. On the shaft of the pinion wheel is also a bevel wheel three feet diame-
ter placed upon arms, which meshes into an eight inch pinion wheel on
another shaft laying horizontal & running in boxes blocks one of which is
mortised into a [illegible] sill & the other into a corner post [illegible]
and with keys on which last mentioned shaft is attached a three foot four
inch band wheel from which a band or strap is taken to a twelve inch
pulley having thro' it a shaft the gudgeons of which run in boxes fixed
eighteen inches below the path of the horses and between the machine & horse
power frame on the side of and adjoining which pulley is a thirty inch
pulley from which a band is taken to the whirl or pulley on the threshing
machine. A bridge is built over the pulleys & straps which are situated
under the horse path. I claim as my invention or improvement the
construction of the gearing of this horse power to run beneath the lever by
which the horses draw, also the placing said horse power firm & substan-
tially on the ground & the communication between the threshing ma-
chine and horse power under the walk of the horses by means of bands,
straps, ropes, chains, or shafts. I also claim as my invention or improve-
ment the lever passing around over the top of the frame of the horse power
and the diamond gudgeon projecting above the centre plate of the horse
power to which said lever is attached. June 24 1831.

Witnesses
B. D. Noxon
Robt. Noyes

Nehemiah P. Stanton. [illegible]

Ch[illegible]

1106 [illegible]